(12) United States Patent
Zou et al.

(10) Patent No.: US 11,953,420 B2
(45) Date of Patent: *Apr. 9, 2024

(54) LIGHT DETECTION SYSTEMS AND METHODS OF USE THEREOF

(71) Applicant: Becton, Dickinson and Company, Franklin Lakes, NJ (US)

(72) Inventors: Jizuo Zou, San Jose, CA (US);
Matthew Bahr, Fremont, CA (US);
Eric D. Diebold, Menlo Park, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,738

(22) Filed: Mar. 15, 2021

(65) Prior Publication Data
US 2021/0199559 A1 Jul. 1, 2021

Related U.S. Application Data

(63) Continuation of application No. 16/817,103, filed on Mar. 12, 2020, now Pat. No. 10,976,236.
(Continued)

(51) Int. Cl.
*G01N 15/1434* (2024.01)
*G01J 1/04* (2006.01)
(Continued)

(52) U.S. Cl.
CPC ........ *G01N 15/1436* (2013.01); *G01J 1/0477* (2013.01); *G01J 1/4228* (2013.01);
(Continued)

(58) Field of Classification Search
CPC ........ G01N 21/49; G01N 21/51; G01N 21/53; G01N 21/532; G01N 2021/4707;
(Continued)

(56) References Cited

U.S. PATENT DOCUMENTS 4,076,420 A   8/1978 De Maeyer et al.
4,498,766 A * 2/1985 Unterleitner ....... G01N 15/1434
                                                    356/73
(Continued)

FOREIGN PATENT DOCUMENTS

CN    104502255        4/2015
CN    108489885 A  *   9/2018
(Continued)

OTHER PUBLICATIONS

Blasi, Thomas et al., "Label-free cell cycle analysis for high-throughput imaging flow cytometry," Nature Communications 7, 10256 (2016), pp. 1-9. https://doi.org/10.1038/ncomms10256 (Year: 2016).*
(Continued)

*Primary Examiner* — Gordon J Stock, Jr.
(74) *Attorney, Agent, or Firm* — Peter W. Schroen; Bret E. Field; BOZICEVIC, FIELD & FRANCIS LLP

(57) ABSTRACT

Light detection systems for measuring light (e.g., in a flow stream) are described. Light detection systems according to embodiments include a light scatter detector, a brightfield photodetector and an optical adjustment component configured to convey light to the light scatter detector and to the brightfield photodetector. Systems and methods for measuring light emitted by a sample (e.g., in a flow stream) and kits having a light scatter detector, a brightfield photodetector and a beam splitter component are also provided.

17 Claims, 3 Drawing Sheets

Related U.S. Application Data

(60) Provisional application No. 62/821,729, filed on Mar. 21, 2019.

(51) Int. Cl.
    *G01J 1/42* (2006.01)
    *G01N 21/47* (2006.01)
    *G01N 21/53* (2006.01)

(52) U.S. Cl.
    CPC ....... *G01N 15/1434* (2013.01); *G01N 21/532* (2013.01); *G01N 2021/4707* (2013.01)

(58) Field of Classification Search
CPC ... G01N 2015/1006; G01N 2015/1477; G01N 2015/1479; G01N 2015/1481; G01N 2015/1486; G01N 2015/149; G01N 15/14; G01N 15/1434; G01N 15/1436; G01N 15/1456; G01N 15/1459; G01N 15/147; G01N 15/02; G01N 15/0205; G01N 15/0211; G01J 3/0213; G01J 3/0229; G01J 3/04; G01J 3/42; G01J 2001/4238; G01J 2001/4242; G01J 1/0418; G01J 1/0437; G01J 1/044; G01J 1/0448; G01J 1/0462; G01J 1/0477; G01J 1/0488; G01J 1/0492; G01J 1/16; G01J 1/1626; G01J 1/4228

See application file for complete search history.

(56) References Cited

U.S. PATENT DOCUMENTS

| | | | | |
|---|---|---|---|---|
| 4,727,020 A * | 2/1988 | Recktenwald | ..... | G01N 33/5094 436/63 |
| 5,125,737 A | 6/1992 | Rodriguez et al. | | |
| 5,192,870 A | 3/1993 | Batchelder et al. | | |
| 5,284,771 A * | 2/1994 | Fan | ..... | G01N 33/5002 436/63 |
| 5,345,306 A | 9/1994 | Ichimura et al. | | |
| 5,436,717 A * | 7/1995 | Ogino | ..... | G01N 15/1404 356/73 |
| 5,844,685 A | 12/1998 | Gontin | | |
| 5,953,681 A * | 9/1999 | Cantatore | ..... | G01N 15/14 702/31 |
| 6,153,873 A | 11/2000 | Wolf | | |
| 7,468,796 B2 * | 12/2008 | Luther | ..... | G01N 21/6428 356/414 |
| 8,730,479 B2 * | 5/2014 | Ness | ..... | G01N 15/1456 356/441 |
| 9,733,176 B2 | 8/2017 | Petersen et al. | | |
| 9,784,661 B2 * | 10/2017 | Jalali | ..... | G01N 21/64 |
| 10,261,080 B2 * | 4/2019 | Li | ..... | G01N 15/1459 |
| 10,976,236 B2 * | 4/2021 | Zou | ..... | G01N 15/147 |
| 11,002,665 B2 * | 5/2021 | Prater | ..... | G02B 21/0032 |
| 2002/0171827 A1 | 11/2002 | Van Den | | |
| 2004/0022685 A1 * | 2/2004 | Singh | ..... | G01N 15/1436 422/82.08 |
| 2006/0068371 A1 | 3/2006 | Ortyn et al. | | |
| 2006/0134003 A1 * | 6/2006 | Georgakoudi | ..... | G01N 15/1459 600/315 |
| 2006/0170870 A1 | 8/2006 | Kaufman et al. | | |
| 2008/0024758 A1 | 1/2008 | Tabata | | |
| 2009/0219530 A1 * | 9/2009 | Mitchell | ..... | G01N 15/1463 356/336 |
| 2011/0058168 A1 * | 3/2011 | Rich | ..... | G01N 15/1434 356/343 |
| 2011/0090500 A1 * | 4/2011 | Hu | ..... | G01N 15/147 356/337 |
| 2011/0177544 A1 * | 7/2011 | Takahashi | ..... | G01N 15/147 435/29 |
| 2011/0235030 A1 * | 9/2011 | Champseix | ..... | G01N 15/14 356/243.2 |
| 2012/0002029 A1 | 1/2012 | Sieracki et al. | | |
| 2012/0044493 A1 | 2/2012 | Smart et al. | | |
| 2012/0328177 A1 * | 12/2012 | George | ..... | G01N 15/14 382/133 |
| 2013/0214176 A1 * | 8/2013 | Graves | ..... | G01N 15/1484 348/335 |
| 2014/0293281 A1 * | 10/2014 | Yamamoto | ..... | G01N 15/1434 356/338 |
| 2014/0339446 A1 | 11/2014 | Yamamoto et al. | | |
| 2015/0115174 A1 * | 4/2015 | Chen | ..... | G02B 27/0025 250/216 |
| 2016/0025611 A1 * | 1/2016 | Fujiwara | ..... | G02B 3/06 356/338 |
| 2016/0033386 A1 * | 2/2016 | Reed | ..... | G02B 19/0085 356/338 |
| 2016/0370294 A1 | 12/2016 | Petersen et al. | | |
| 2017/0268981 A1 | 9/2017 | Diebold et al. | | |
| 2017/0315039 A1 * | 11/2017 | Beil | ..... | G01N 15/0211 |
| 2018/0038803 A1 | 2/2018 | Cui et al. | | |
| 2018/0046139 A1 * | 2/2018 | Stahl | ..... | G03H 1/2645 |
| 2018/0073974 A1 | 3/2018 | Diebold et al. | | |
| 2018/0246029 A1 * | 8/2018 | Wu | ..... | G01J 3/513 |
| 2018/0284010 A1 * | 10/2018 | Scarcelli | ..... | G01J 3/44 |
| 2019/0226975 A1 | 7/2019 | Osborne et al. | | |

FOREIGN PATENT DOCUMENTS

| | | |
|---|---|---|
| EP | 0564157 A1 | 10/1993 |
| EP | 0822404 A2 | 2/1998 |
| EP | 3096125 A1 | 11/2016 |
| JP | 2016524703 A | 8/2016 |
| WO | WO2018052798 A1 | 9/2017 |
| WO | WO2019209548 A1 | 10/2019 |
| WO | WO2019245709 A1 | 12/2019 |
| WO | WO2020139848 A1 | 7/2020 |
| WO | WO-2020147255 A1 * | 7/2020 |

OTHER PUBLICATIONS

George, Thaddeus et al., "Quantitative measurement of nuclear translocation events using similarity analysis of multispectral cellular images obtained in flow," 2006, Journal of Immunological Methods 311, pp. 117-129. (Year: 2006).*

Headland, Sarah et al., "Cutting-Edge Analysis of Extracellular Microparticles using ImageStreamx Imaging Flow Cytometry," Scientific Reports 4, 5237 (2014), pp. 1-10. https://doi.org/10.1038/srep05237 (Year: 2014).*

Marangon, Iris et al., "Localization and Relative Quantification of Carbon Nanotubes in Cells with Multispectral Imaging Flow Cytometry," Journal of Visualized Experiments (82), e50566, doi:10.3791/50566 (2013), pp. 1-10. (Year: 2013).*

Stavrakis, Stavros et al., "High-throughput microfluidic imaging flow cytometry," 2019, Current Opinion in Biotechnology 55:36-43. ( Year: 2019).*

Stewart, et al. "Resolving Leukocytes Using Axial Light Loss1", cytometry 10:426-432 (1989).

Photonics Spectra, Dec. 2018, vol. 52, No. 12, Digital edition, Tech feature 44, Photodetectors in Flow cytometers. 71 Pages. URL: https://www.photonicsspectra-digital.com/photonicsspectra/december_2018/MobilePagedReplica.action?pm=2&folio=Cover #pg1>.

* cited by examiner

LIGHT DETECTION SYSTEMS AND METHODS OF USE THEREOF

CROSS-REFERENCE TO RELATED APPLICATION

This application is related to U.S. Provisional Patent Application Ser. No. 62/821,729 filed Mar. 21, 2019; the disclosure of which application is herein incorporated by reference.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. To quantify these variations, the light is collected and directed to the surface of a detector. The amount of light that reaches the detector can impact the overall quality of the optical signal outputted by the detector. The amount of light that reaches the detector can be raised by increasing the surface area of the detector or by increasing collection of the light from the sample.

One technique that utilizes light detection to characterize the components in a sample is flow cytometry. Using data generated from the detected light, distributions of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence.

SUMMARY

Aspects of the present disclosure include light detection systems. Systems according to certain embodiments include a light scatter detector, a brightfield photodetector and an optical adjustment component configured to convey light to the light scatter detector and to the brightfield photodetector. In some embodiments, the light scatter detector is a forward scatter detector. In embodiments, the optical adjustment component is a beam splitter that is configured to propagate light to the light scatter detector and the brightfield photodetector. In certain instances, the beam splitter is configured to convey 10% or less of the light to the brightfield photodetector. In these instances, the beam splitter is configured to convey 90% or more of the light to the scatter detector. In some instances, the beam splitter is a wedged beam splitter, such as where the beamsplitter has at least one wedged side having a wedge angle of from 5 arc minute to 120 arc minute, such as from 10 arc minute to 60 arc minute. Light detection systems according to certain embodiments also include an obscuration component positioned proximate to one or more of the light scatter detector and the brightfield photodetector. For example, the light obscuration component may be a scatter bar, an obscuration disc or an optical aperture, such as a slit or a pinhole.

Aspects of the present disclosure also include systems for measuring light from a sample (e.g., in a flow stream). In certain embodiments, systems include a light source and a light detection system that detects one or more wavelengths of light having a light scatter detector, a brightfield photodetector and an optical adjustment component configured to convey light to the light scatter detector and to the brightfield photodetector. In some embodiments, the light source is a light beam generator that produces a plurality of frequency shifted beams of light (e.g., a first beam of radiofrequency-shifted light and a second beam of radiofrequency-shifted light). In certain instances, the light beam generator includes an acousto-optic deflector, such as an acousto-optic deflector that is operatively coupled to a direct digital synthesizer radiofrequency comb generator. In these instances, the light beam generator is configured to generate a local oscillator beam and a plurality of comb beams (e.g., radiofrequency-shifted local oscillator beam and radiofrequency-shifted comb beams). In some embodiments, the light source includes a laser, such as a continuous wave laser. In certain instances, systems also include an optical collection system for propagating light to the light detection system. The optical collection system may be a free-space light relay system or may include fiber optics such as a fiber optics light relay bundle. In some embodiments, the system is a flow cytometer.

The subject systems may also include a computer processor for collecting and outputting data from the measured light of the light detection system. In embodiments, the processor may include memory operably coupled to the processor where the memory includes instructions stored thereon, which when executed by the processor, cause the processor to generate data signals from the light detected by the scatter detector and the brightfield photodetector. The memory may further include instructions to generate an image based on the data signals from the light scatter detector and the brightfield photodetector. In some instances, the memory includes instructions which when executed by the processor, cause the processor to identify particles in the image. In certain instances, the memory includes instructions which when executed by the processor, cause the processor to differentiate between types of particles in the image. In these embodiments, the particles may be cells and the subject systems are configured to identify and differentiate between types of cells.

Aspects of the disclosure also include methods for irradiating a sample (e.g., in a flow stream) with a light source, collecting and detecting light from the sample with the subject light detection systems and measuring the detected light at one or more wavelengths. In some embodiments, methods include irradiating a flow stream with a plurality of frequency-shifted beams of light (e.g., with a radiofrequency-shifted local oscillator beam and a plurality of radiofrequency-shifted comb beams). In certain embodiments, methods include applying a radiofrequency drive signal to an acousto-optic device; and irradiating the acousto-optic device with a laser to generate the plurality of radiofrequency-shifted beams of light. Light from the light scatter detector and the brightfield detector is measured to generate data signals. In some embodiments, the data signals from the light scatter detector and the brightfield detector is used to form an image. Methods according to certain embodiments, include identifying particles in the generated image, where in some instances particles (e.g., cells) in the image are differentiated. In certain embodiments, light is collected and propagated to the light detection system by a free-space light relay system. In other embodiments, light is collected and propagated to the light detection system by fiber optics, such as a fiber optics light relay bundle.

Kits including one or more components of the subject light detection systems are also provided. Kits according to certain embodiments, include a light scatter detector, a brightfield photodetector and beam splitter. In some embodiments, kits include one or more obscuration components, such as a scatter bar, an obscuration disc, an optical slit or a pinhole. Kits may also include one or more lasers (e.g., continuous wave laser) as well as components of a light beam generator for generating a plurality of frequency-shifted beams of light such as an acousto-optic deflector and direct digital synthesizer.

BRIEF DESCRIPTION OF THE FIGURES

The invention may be best understood from the following detailed description when read in conjunction with the accompanying drawings. Included in the drawings are the following figure.

DETAILED DESCRIPTION

Figure 1:
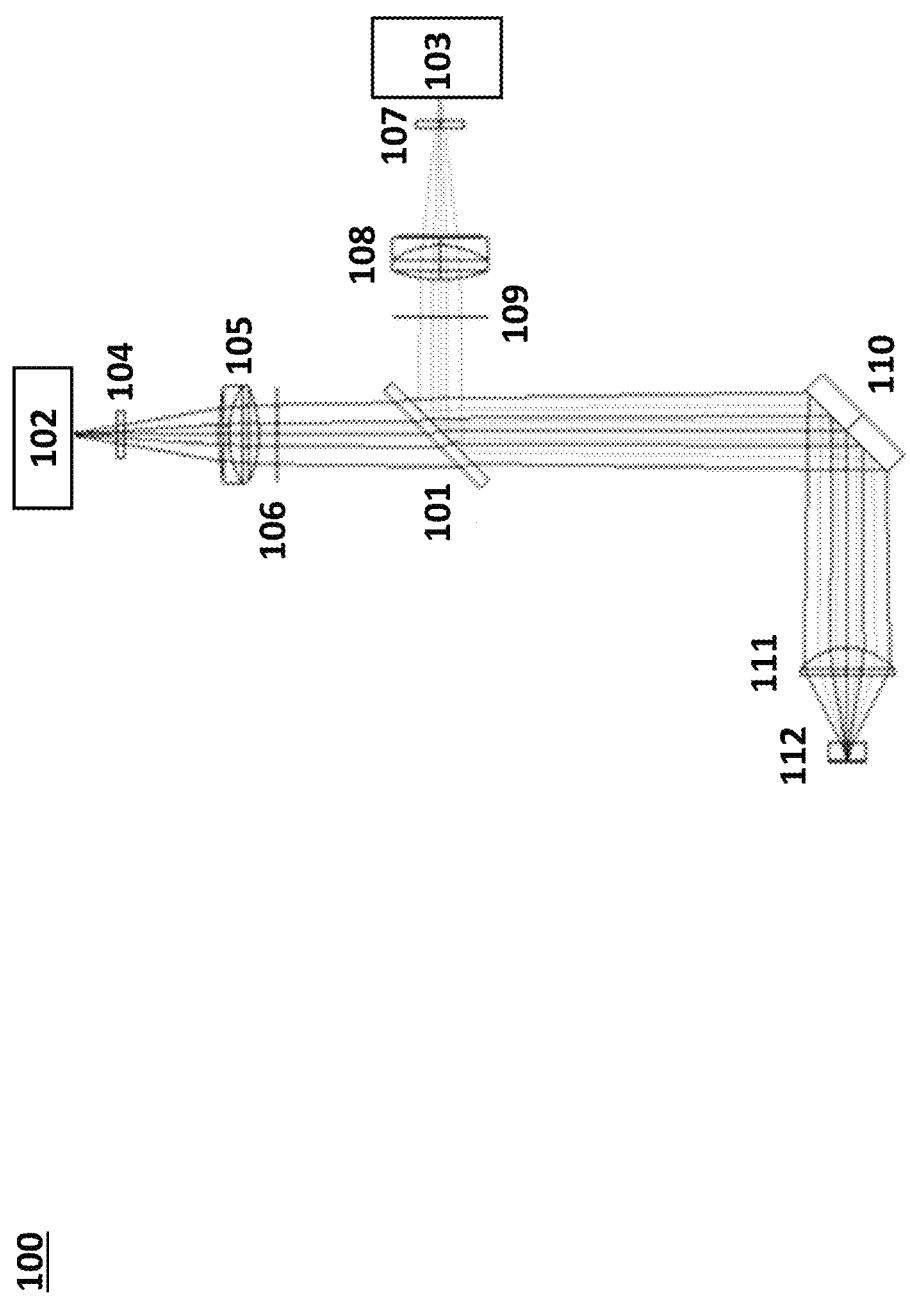
FIG. 1 depicts a light detection system having a light scatter detector, a brightfield photodetector and a wedged beam splitter according to certain embodiments of the present disclosure.

Light detection systems for measuring light (e.g., in a flow stream) are described. Light detection systems according to embodiments include a light scatter detector, a brightfield photodetector and an optical adjustment component configured to convey light to the light scatter detector and to the brightfield photodetector. Systems and methods for measuring light emitted by a sample (e.g., in a flow stream) and kits having a light scatter detector, a brightfield photodetector and a beam splitter component are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides light detection systems having a light scatter detector, a brightfield photodetector and an optical adjustment component configured to convey light to the forward scatter detector and to the brightfield photodetector. In further describing embodiments of the disclosure, light detection systems in accordance with embodiments of the invention are described first in greater detail. Next, systems and methods for measuring light emitted by a sample (e.g., in a flow stream) are described. Kits having a light scatter detector, a brightfield photodetector and a beam splitter are also provided.

LIGHT DETECTIONS SYSTEMS

Aspects of the present disclosure include light detection systems configured for detecting light emitted by a sample (e.g., in a flow stream of a flow cytometer). As described in greater detail below, light detection systems include a light scatter detector and a brightfield photodetector where light from the sample is propagated to the light scatter detector and the brightfield photodetector through an optical adjustment component. In certain embodiments, the subject light detection system is configured for generating an image of particles in the sample, such as cells in a biological sample. In embodiments, the optical adjustment component is configured to convey light from the sample to both the scatter detector and brightfield photodetector. The amount of light propagated to each component depends on the type of sample and desired images generated where in some embodiments, 20% or less of the light from the sample is conveyed to the brightfield photodetector through the optical adjustment component, such as 15% or less, such as 10% or less, such as 5% or less, such as 4% or less, such as 3% or less, such as 2% or less, such as 1% or less and including 0.5% or less of the light from the sample is conveyed to the brightfield photodetector through the optical adjustment component. In these embodiments, 80% or more of the light from the sample is conveyed to the light scatter detector, such as 85% or more, such as 90% or more, such as 95% or more, such as 96% or more, such as 97% or more, such as 98% or more, such as 99% or more and including 99.5% or more of the light from the sample is conveyed to the light scatter detector.

As summarized above, light detection systems include a light scatter detector. The term "light scatter" is used herein in its conventional sense to refer to the propagation of light energy from particles in the sample (e.g., flowing in a flow stream) that are deflected from the incident beam path, such as by reflection, refraction or deflection of the beam of light. In embodiments, the scattered light may be detected at an angle with respect to the incident light irradiation, such as at an angle of 5° or more, such as 10° or more, such as 15° or more, such as 20° or more, such as 25° or more, such as 30° or more, such as 45° or more, such as 60° or more, such as 75° or more, such as 90° or more, such as 135° or more, such as 150° or more and including where the scattered light detector is configured to detect light from particles in the sample at an angle that is 180°. In certain instances, the light scatter detector is a side scatter detector, such as where the detector is positioned at an angle of from 45° to 90° with respect to the incident beam of light irradiation, such as from 50° to 85°, such as from 55° to 80° and including from 60° to 70°. In certain instances, the light scatter detector is a side scatter detector positioned at an angle of 90° with respect to the incident beam of light irradiation. In other instances, the light scatter detector is a forward scatter detector, such as where the detector is positioned at an angle of from 90° to 180° with respect to the incident beam of light irradiation, such as from 100° to 170°, such as from 110° to 160° and including from 120° to 150°.

The light scatter detector may be any suitable photosensor, such as active-pixel sensors (APSs), avalanche photodiode, image sensors, charge-coupled devices (CCDs), intensified charge-coupled devices (ICCDs), complementary metal-oxide semiconductor (CMOS) image sensors or N-type metal-oxide semiconductor (NMOS) image sensors, light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other types of photodetectors. In embodiments, the light scatter detector may include 1 or more photosensor, such as 2 or more, such as 3 or more, such as 5 or more, such as 10 or more and including 25 or more photosensors. In some instances, the light scatter detector is a photodetector array. The term "photodetector array" is used in its conventional sense to refer to an arrangement or series of two or more photodetectors that are configured to detect light. In embodiments, photodetector arrays may include 2 or more photodetectors, such as 3 or more photodetectors, such as 4 or more photodetectors, such as 5 or more photodetectors, such as 6 or more photodetectors, such as 7 or more photodetectors, such as 8 or more photodetectors, such as 9 or more photodetectors, such as 10 or more photodetectors, such as 12 or more photodetectors and including 15 or more photodetectors. In certain embodiments, photodetector arrays include 5 photodetectors. The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. The photodetectors in a light scatter photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°.

Light detection systems of the present disclosure also include a brightfield photodetector. The term "brightfield" is used herein in its conventional sense to refer to the detection of transmitted light, such as where the contrast in the detected light is caused by attenuation of the transmitted light by particles in the sample. In some embodiments, the brightfield photodetector is a light loss detector. The term "light loss" is used herein in its conventional sense to refer to an optical sensor that is configured to measure light attenuation such as by particles (e.g., cells) in a sample in the flow stream.

Any suitable photodetector protocol may be employed for the brightfield photodetector and may include, but is not limited to active-pixel sensors (APSs), avalanche photodiode, image sensors, charge-coupled devices (CCDs), intensified charge-coupled devices (ICCDs), complementary metal-oxide semiconductor (CMOS) image sensors or N-type metal-oxide semiconductor (NMOS) image sensors, light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other types of photodetectors. In embodiments, the brightfield photodetector may include 1 or more photosensor, such as 2 or more, such as 3 or more, such as 5 or more, such as 10 or more and including 25 or more photosensors. In some instances, the brightfield photodetector detector is a photodetector array that is composed of, for example, 2 or more photodetectors, such as 3 or more photodetectors, such as 4 or more photodetectors, such as 5 or more photodetectors, such as 6 or more photodetectors, such as 7 or more photodetectors, such as 8 or more photodetectors, such as 9 or more photodetectors, such as 10 or more photodetectors, such as 12 or more photodetectors and including 15 or more photodetectors. Where the brightfield photodetector is an array, the photodetectors may be arranged in any geometric configuration, such as in a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. The photodetectors in a brightfield photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°.

Depending on the optical adjustment component employed to convey light to the light scatter detector and the brightfield photodetector, the light scatter detector and the brightfield photodetector may be positioned at an angle to each other that varies, such as at an angle ranging from 5° to 90°, such as from 10° to 85°, such as from 15° to 80°, such as from 20° to 75°, such as from 25° to 70°, such as from 30° to 65°, such as from 35° to 60° and including from 45° to 60°. In certain embodiments, the light scatter detector is positioned orthogonally with respect to the brightfield photodetector.

The light scatter detectors and the brightfield photodetectors of the present disclosure are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, the subject photodetectors are configured to measure collected light over a range of wavelengths (e.g., 200 nm-1000 nm). In certain embodiments, detectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. In embodiments, the light detection system is configured to measure light continuously or in discrete intervals. In some instances, detectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In embodiments of the present disclosure, light detection systems include an optical adjustment component configured to convey light to the light scatter detector and the brightfield photodetector. The term "optical adjustment" is used herein in its convention sense to refer to an optical component that changes or adjusts light that is propagated to the light scatter detector and the brightfield photodetector. For example, the optical adjustment may be to change the profile of the light beam, the focus of the light beam, the direction of beam propagation or to collimate the light beam. In certain embodiments, optical adjustment includes splitting the beam of light such that part of the collected light (e.g., from a sample in a flow stream) is propagated to the light scatter detector and another part of the collected light is propagated to the brightfield photodetector.

As described above, the amount of light propagated to the brightfield photodetector in the subject light detection systems may vary, where in some embodiments 50% or less of the collected light is conveyed to the brightfield photodetector through the optical adjustment component, such as 45% or less, such as 40% or less, such as 35% or less, such as 30% or less, such as 25% or less, such as 20% or less, such as 15% or less, such as 10% or less and including 5% or less of the light collected by the light detection system is conveyed to the brightfield photodetector through the optical adjustment component. For example, the amount of collected light (e.g., from a sample in a flow stream) that is propagated through the optical adjustment component to the brightfield photodetector may range from 1% to 75%, such as from 2% to 70%, such as from 3% to 65%, such as from 4% to 60% and including from 5% to 50%.

The amount of light propagated to the light scatter detector through the optical adjustment component may also vary, where in some embodiments, 50% or more of the collected light is conveyed to the light scatter detector, such as 55% or more, such as 60% or more, such as 65% or more, such as 75% or more, such as 80% or more, such as 90% or more and including 95% or more of the light collected by the subject light detection system is conveyed to the light scatter detector through the optical adjustment component. For example, the amount of light propagated to the light scatter detector through the optical adjustment component may range from 25% to 99%, such as from 30% to 95%, such as from 35% to 90%, such as from 40% to 85%, such as from 45% to 80% and including from 50% to 75%. In certain embodiments, 10% of the collected light is propagated to the brightfield photodetector and 90% of the collected light is propagated to the light scatter detector.

In some embodiments, the optical adjustment component is a beamsplitter. The term "beamsplitter" is used herein in its conventional sense to refer to the optical component that is configured to propagate a beam of light along two or more different optical paths, such that a predetermined portion of the light is propagated along each optical path. Any convenient light beamsplitting protocol may be employed such as with triangular prism, slivered mirror prisms, dichroic mirror prisms, among other types of beamsplitters. The beamsplitter may be formed from any suitable material so long as the beamsplitter is capable of propagating the desired amount and wavelengths of light to the light scatter detector and brightfield photodetector. For example, beamsplitters or interest may be formed from glass (e.g., N-SF10, N-SF11, N-SF57, N-BK7, N-LAK21 or N-LAF35 glass), silica (e.g., fused silica), quartz, crystal (e.g., $CaF_2$ crystal), zinc selenide (ZnSe), $F_2$, germanium (Ge) titanate (e.g., S-TIH11), borosilicate (e.g., BK7). In certain embodiments, the beamsplitter is formed from a polymeric material, such as, but not limited to, polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials. In certain embodiments, the beamsplitter is formed from a polyester, where polyesters of interest may include, but are not limited to, poly(alkylene terephthalates)

such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediylalkylene dicarboxylates) such as poly(trans-1,4-cyclohexanediylethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3', 5,5'-tetramethylbisphenol A; polyamides such as poly(p-phenylene terephthalamide); polyethylene Terephthalate (e.g., Mylar™ Polyethylene Terephthalate), combinations thereof, and the like.

In certain embodiments, the optical adjustment component is a wedged beamsplitter. In these embodiments, the beamsplitter is a beamsplitter having a wedge angle that produces non-collinear back reflection such that propagation of collected light through the wedged beamsplitter results in a small change in the angle of light propagated to one or more of the light scatter detector and brightfield photodetector. Wedged beamsplitters according to embodiments of the present disclosure have a wedge angle where a change in the incident angle of collected light results in a deviation in the propagated light angle by 0.001% or more, such as by 0.005% or more, such as by 0.01% or more, such as by 0.05% or more, such as by 0.1% or more, such as by 0.5% or more, such as by 1% or more, such as by 2% or more, such as by 3% or more, such as by 5% or more and including by 10% or more. In some embodiments, the wedged beamsplitter has a wedge angle of from 5 arc minute to 120 arc minute, such as from 10 arc minute to 115 arc minute, such as from 15 arc minute to 110 arc minute, such as from 20 arc minute to 105 arc minute, such as from 25 arc minute to 100 arc minute, such as from 30 arc minute to 105 arc minute, such as from 35 arc minute to 100 arc minute, such as from 40 arc minute to 95 arc minute and including from 45 arc minute to 90 arc minute. In certain embodiments, the wedged beamsplitter has a wedge angle that is sufficient to reduce or eliminate light interference. In other embodiments, the wedged beamsplitter has a wedge angle that is sufficient to reduce or eliminate image artifacts from the measured light by the brightfield photodetector.

In some embodiments, the wedged beamsplitter has a transparency window of from 150 nm to 5 µm; from 180 nm to 8 µm, from 185 nm to 2.1 µm, from 200 nm to 6 µm, from 200 nm to 11 µm, from 250 nm to 1.6 µm, from 350 nm to 2 µm, from 600 nm to 16 µm, from 1.2 µm to 8 µm, from 2 µm to 16 µm or some other wavelength range.

Beamsplitters of interest may be configured to split the amount of light propagated to the light scatter detector and the brightfield photodetector as desired. In embodiments, the beamsplitter may have a beam splitting light ratio between the brightfield photodetector and light scatter detector of from 1:99 to 99:1, such as from 5:95 to 95:5, such as from 10:90 to 90:10, such as from 20:80 to 80:20, such as from 25:75 to 75:25 and including a beam splitting ratio of 50:50. In certain embodiments, the beamsplitter is a 10:90 beamsplitter where 10% of light is propagated to the brightfield photodetector and 90% of light is propagated to the light scatter detector.

In some embodiments, spatial position of the beamsplitter is adjustable, such as manually (by hand) or with a motor-driven displacement device. For example, the angle of the beamsplitter may be adjusted in the subject light detection system by 5° or more, such as by 10° or more, such as by 15° or more, such as by 20° or more, such as by 30° or more, such as by 45° or more, such as by 60° or more and including by 75° or more. In certain instances, the spatial position of the beamsplitter can be adjusted in the light detection system, such as by 1 mm or more, such as by 5 mm or more, such as by 10 mm or more and including by 25 mm or more. Any convenient motor-driven actuator can be used, such as for example a motor actuated displacement stage, motor driven leadscrew assembly, motor-operated geared actuation device employing a stepper motor, servo motor, brushless electric motor, brushed DC motor, micro-step drive motor, high resolution stepper motor, among other types of motors. In one example, the horizontal or vertical position or the angle of orientation of the beamsplitter can be adjusted with a motor-driven displacement device.

In some embodiments, light from the optical adjustment component is propagated through an obscuration component to the brightfield photodetector. In these embodiments, the obscuration component is configured to reduce the amount of light that is conveyed to the brightfield photodetector, such as reducing the amount of light that is conveyed to the brightfield photodetector by 1% or more, such as by 5% or more, such as by 10% or more, such as by 25% or more, such as by 40% or more and including reducing the amount of light that is conveyed to the brightfield photodetector by 50% or more. Any convenient obscuration protocol may be employed, including but not limited to optical apertures (e.g., pinholes) or slits. The size of the optical aperture may vary as desired, where apertures of interest range from 0.001 mm to 10 mm, such as from 0.005 mm to 9.5 mm, such as from 0.01 mm to 9 mm, such as from 0.05 mm to 8.5 mm, such as from 0.1 mm to 8 mm, such as from 0.5 mm to 7.5 mm and including from 1 mm to 5 mm. Obscuration slits of interest may also vary where the width of the slit ranges from 0.001 mm to 10 mm, such as from 0.005 mm to 9.5 mm, such as from 0.01 mm to 9 mm, such as from 0.05 mm to 8.5 mm, such as from 0.1 mm to 8 mm, such as from 0.5 mm to 7.5 mm and including from 1 mm to 5 mm. The length of the obscuration slit may vary depending on the width of propagated light to the brightfield photodetector and may range from 1 mm to 50 mm, such as from 2 mm to 45 mm, such as from 3 mm to 40 mm, such as from 4 mm to 35 mm and including from 5 mm to 25 mm.

In certain embodiments, light is also propagated to the light scatter detector through one or more obscuration components, such as a scatter bar or a obscuration disc. The obscuration component employed to reduce the amount of light conveyed to the light scatter detector may be any convenient shape where cross-sectional shapes of interest include, but are not limited to rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In some embodiments, the obscuration component is a circle. In other embodiments, the obscuration component is an oval. In yet other embodiments, the obscuration component is polygonal-shaped, such as square-shaped or rectangular. The width of the obscuration component may vary, ranging in some instances from 1 mm to 25 mm, such as from 2 mm to 22 mm, such as from 3 mm to 20 mm, such as from 4 mm to 17 mm and including from 5 mm to 15 mm. The length of each obscuration component ranges from 1 mm to 50 mm, such as from 2 mm to 45 mm, such as from 3 mm to 40 mm, such as from 4 m to 35 mm, such as from 5 mm to 30 mm and including from 10 mm to 20 mm.

In some instances, optical adjustment of the collected light further includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam. In other instances, optical adjustment includes changing the direction of the light beam, such as changing the propagation of the light beam by 1° or more, such as by 5° or more, such as by 10° or more, such as by 15° or more, such as by 20° or more, such as by 25° or more, such as by 30° or more, such as by 45° or more, such as by 60° or more, such as by 75° or more and including changing the direction of light propagation by 90° or more. In yet other instances, optical adjustment is a de-magnification protocol so as to decrease the dimensions of the light (e.g., beam spot), such as decreasing the dimensions by 5% or more, such as by 10% or more, such as by 25% or more, such as by 50% or more and including decreasing the dimensions by 75% or more.

FIG. 1 depicts a light detection system having a light scatter detector, a brightfield photodetector and a wedged beam splitter according to certain embodiments of the present disclosure. Light collection system 100 is configured to receive light from flow cell 112 through aspheric lens 111 and propagated by mirror 110 to wedged beamsplitter 101. Wedged beamsplitter 101 conveys a part of the light through obscuration disc 106 and lens 105 and filter 104 to forward light scatter detector 102. Wedged beamsplitter 101 also conveys a part of the light orthogonally to brightfield photodetector 103 through aperture 109 and lens 108 and filter 107.

In some embodiments, light received by the subject light detection system may be conveyed by an optical collection system. The optical collection system may be any suitable light collection protocol that collects and directs the light. In some embodiments, the optical collection system includes fiber optics, such as a fiber optics light relay bundle. In other embodiments, the optical collection system is a free-space light relay system.

In embodiments, the optical collection system may be physically coupled to the light detection system, such as with an adhesive, co-molded together or integrated into the light detection system. In certain embodiments, the optical collection system and light detection system are integrated into a single unit. In some instances, the optical collection system is coupled to the light detection system with a connector that fastens the optical collection system to the light detection system, such as with a hook and loop fasteners, magnets, latches, notches, countersinks, counterbores, grooves, pins, tethers, hinges, Velcro, non-permanent adhesives or a combination thereof.

In other embodiments, the light detection system and the optical collection system are in optical communication, but are not physically in contact. In embodiments, the optical collection system may be positioned 0.001 mm or more from the light detection system, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the light detection system.

In certain embodiments, the optical collection system includes fiber optics. For example, the optical collection system may be a fiber optics light relay bundle and light is conveyed through the fiber optics light relay bundle to the light detection system. Any fiber optics light relay system may be employed to propagate light to the light detection system. In certain embodiments, suitable fiber optics light relay systems for propagating light to the light detection system include, but are not limited to, fiber optics light relay systems such as those described in U.S. Pat. No. 6,809,804, the disclosure of which is herein incorporated by reference.

In other embodiments, the optical collection system is a free-space light relay system. The phrase "free-space light relay" is used herein in its conventional sense to refer to light propagation that employs a configuration of one or more optical components to direct light to the light detection system through free-space. In certain embodiments, the free-space light relay system includes a housing having a proximal end and a distal end, the proximal end being coupled to the light detection system. The free-space relay system may include any combination of different optical adjustment components, such as one or more of lenses, mirrors, slits, pinholes, wavelength separators, or a combination thereof. For example, in some embodiments, free-space light relay systems of interest include one or more focusing lens. In other embodiments, the subject free-space light relay systems include one or more mirrors. In yet other embodiments, the free-space light relay system includes a collimating lens. In certain embodiments, suitable free-space light relay systems for propagating light to the light detection system, but are not limited to, light relay systems such as those described in U.S. Pat. Nos. 7,643,142; 7,728,974 and 8,223,445, the disclosures of which is herein incorporated by reference.

SYSTEMS FOR MEASURING LIGHT FROM A SAMPLE

Aspects of the present disclosure also include systems for measuring light from a sample (e.g., in the flow stream in a flow cytometer). In certain embodiments, systems include a light source and a light detection system having a light scatter detector, a brightfield photodetector and an optical adjustment component configured to convey light to the light scatter detector and the brightfield photodetector, as described above. In some embodiments, the system is a flow cytometer. In some instances, the light detection system having the light scatter detector, a brightfield photodetector and an optical adjustment component is non-releasably integrated into the flow cytometer. In certain embodiments, the light detection system is in optical communication with the source of sample (e.g., the flow stream in a flow cytometer) through an optical collection system (e.g., fiber optics or free-space light relay system).

Systems of interest for measuring light from a sample include a light source. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In certain embodiments, systems further include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 μL/min or more, such as 2 μL/min or more, such as 3 μL/min or more, such as 5 μL/min or more, such as 10 μL/min or more, such as 15 μL/min or more, such as 25 μL/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 μL/min (microliter per minute) or more, such as 2 μL/min or more, such as 3 μL/min or more, such as 5 μL/min or more, such as 10 μL/min or more, such as 25 μL/min or more, such as 50 μL/min or more, such as 75 μL/min or more, such as 100 μL/min or more, such as 250 μL/min or more, such as 500 μL/min or more, such as 750 μL/min or more and including 1000 μL/min or more. For example, the system may include a pump that is configured to flow sample through the flow cell at a rate that ranges from 1 μL/min to 500 μL/min, such as from 1 uL/min to 250 uL/min, such as from 1 uL/min to 100 uL/min, such as from 2 μL/min to 90 μL/min, such as from 3 μL/min to 80 μL/min, such as from 4 μL/min to 70 μL/min, such as from 5 μL/min to 60 μL/min and including rom 10 μL/min to 50 μL/min. In certain embodiments, the flow rate of the flow stream is from 5 μL/min to 6 μL/min.

In certain embodiments, the subject systems are flow cytometric systems employing the above described light detection system for detecting light emitted by a sample in a flow stream. In certain embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* Janury; 49(pt 1):17-28; Linden, et. al., *Semin Throm Hemost.* 2004 October; 30(5):502-11; Alison, et al. *J Pathol*, 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain instances, the subject systems are flow cytometry systems configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

Figure 3:
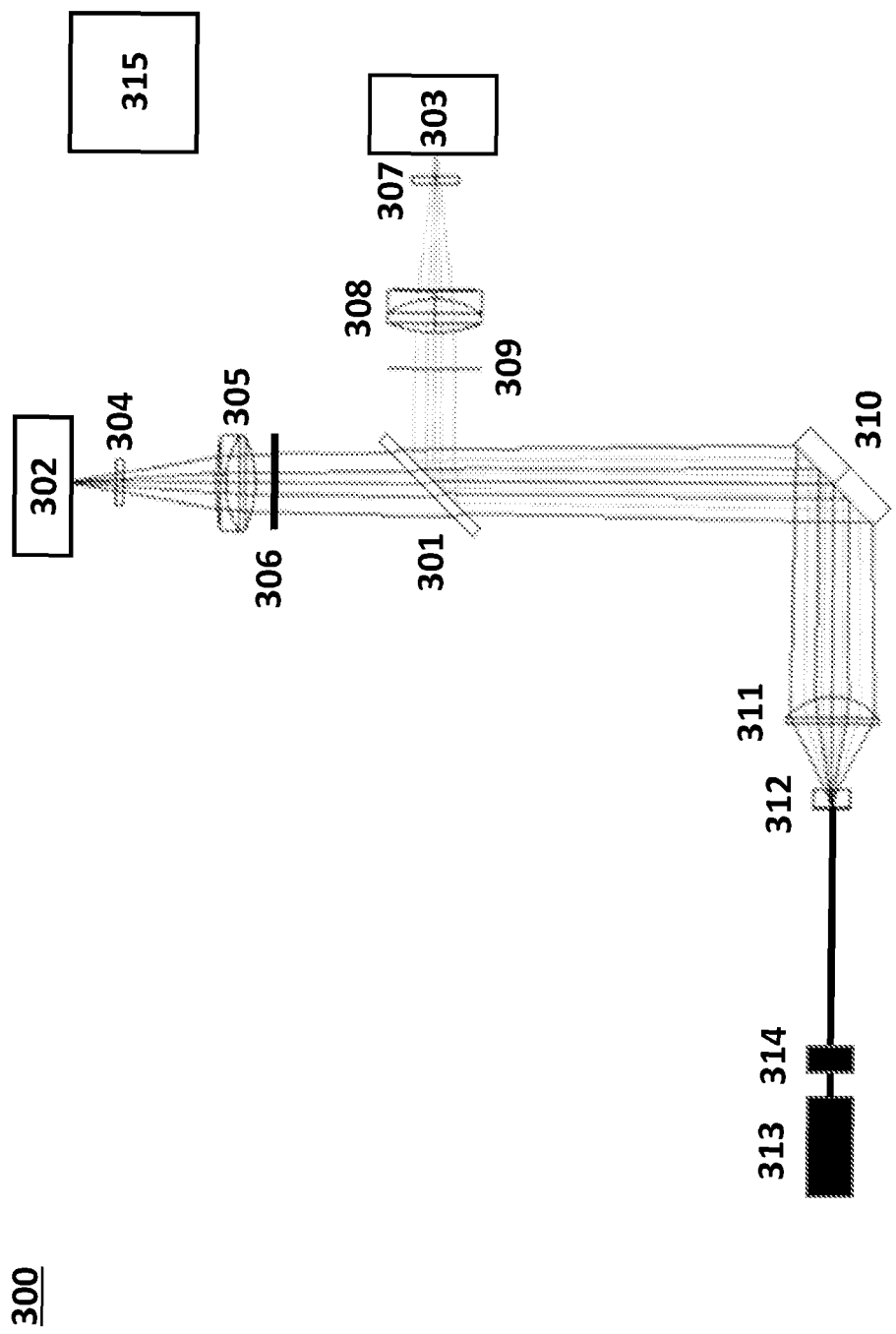
FIG. 3 depicts a system for measuring light from a sample according to certain embodiments.

FIG. 3 depicts a system having a light source, a light scatter detector, a brightfield photodetector and a wedged beam splitter according to certain embodiments of the present disclosure. In system 300, a light source in the form of a light beam generator 313 is configured to emit a beam. Light beam generator 313 includes an acousto-optic deflector 314 for generating a local oscillator beam and a plurality of comb beams. Light is received from flow cell 312 through aspheric lens 311 and propagated by mirror 310 to wedged beamsplitter 301. Wedged beamsplitter 301 conveys a part of the light through scatter bar 306 and lens 305 and filter 304 to forward light scatter detector 302. Wedged beamsplitter 301 also conveys a part of the light orthogonally to brightfield photodetector 303 through aperture 309 and lens 308 and filter 307. System 300 also includes processor 315 configured to generate an image based on the signals obtained from the forward light scatter detector 302 and the brightfield photodetector 303.

METHODS FOR MEASURING LIGHT COLLECTED FROM AN IRRADIATED SAMPLE

Aspects of the disclosure also include methods for measuring light from a sample (e.g., in the flow stream in a flow cytometer). In practicing methods according to embodiments, a sample is irradiated with a light source and light from the sample is detected with the light detection systems having a light scatter detector, a brightfield photodetector and an optical adjustment component configured to convey light to the light scatter detector and brightfield photodetector as described above. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the flow stream with one or more lasers. As discussed above, the type and number of lasers will vary depending on the sample as well as desired light collected and may be a pulsed laser or continuous wave laser. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, $Nd:YVO_4$ laser, $Nd:YCa_4O(BO_3)_3$ laser, Nd:YCOB laser, titanium sapphire laser, thulim YAG laser, ytterbium YAG laser, $ytterbium_2O_3$ laser or cerium doped lasers and combinations thereof; a semiconductor diode laser, optically pumped semiconductor laser (OPSL), or a frequency doubled- or frequency tripled implementation of any of the above mentioned lasers.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

As discussed above, in embodiments light from the irradiated sample is conveyed to a light detection system as described herein and measured by one or more photodetectors. In practicing the subject methods, light is propagated to the light detection system. The light is further propagated to the light scatter detector and the brightfield photodetector through the optical adjustment component. In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In some embodiments, methods include further adjusting the light before detecting the light with the subject light detection systems. For example, the light from the sample source may be passed through one or more lenses, mirrors, pinholes, slits, gratings, light refractors, and any combination thereof. In some instances, the collected light is passed through one or more focusing lenses, such as to reduce the profile of the light directed to the light detection system or optical collection system as described above. In other instances, the emitted light from the sample is passed through one or more collimators to reduce light beam divergence conveyed to the light detection system.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain embodiments, the sample in the flow stream includes cells and methods include detecting the cells in the sample. In some embodiments, detecting the cells includes identifying the types of cells in the sample. In other embodiments, methods include characterizing the cells of the sample. In yet other embodiments, methods include differentiating between types of cells in the sample. In certain embodiments, methods include identifying and differentiating between types of cells based on data signals from the light scatter detector and data signals from the brightfield photodetector. In some instances, methods include generating an image of the flow stream and identifying the types of cells in the sample based on data signals from the light scatter detector and data signals from the brightfield photodetector.

Figure 2:
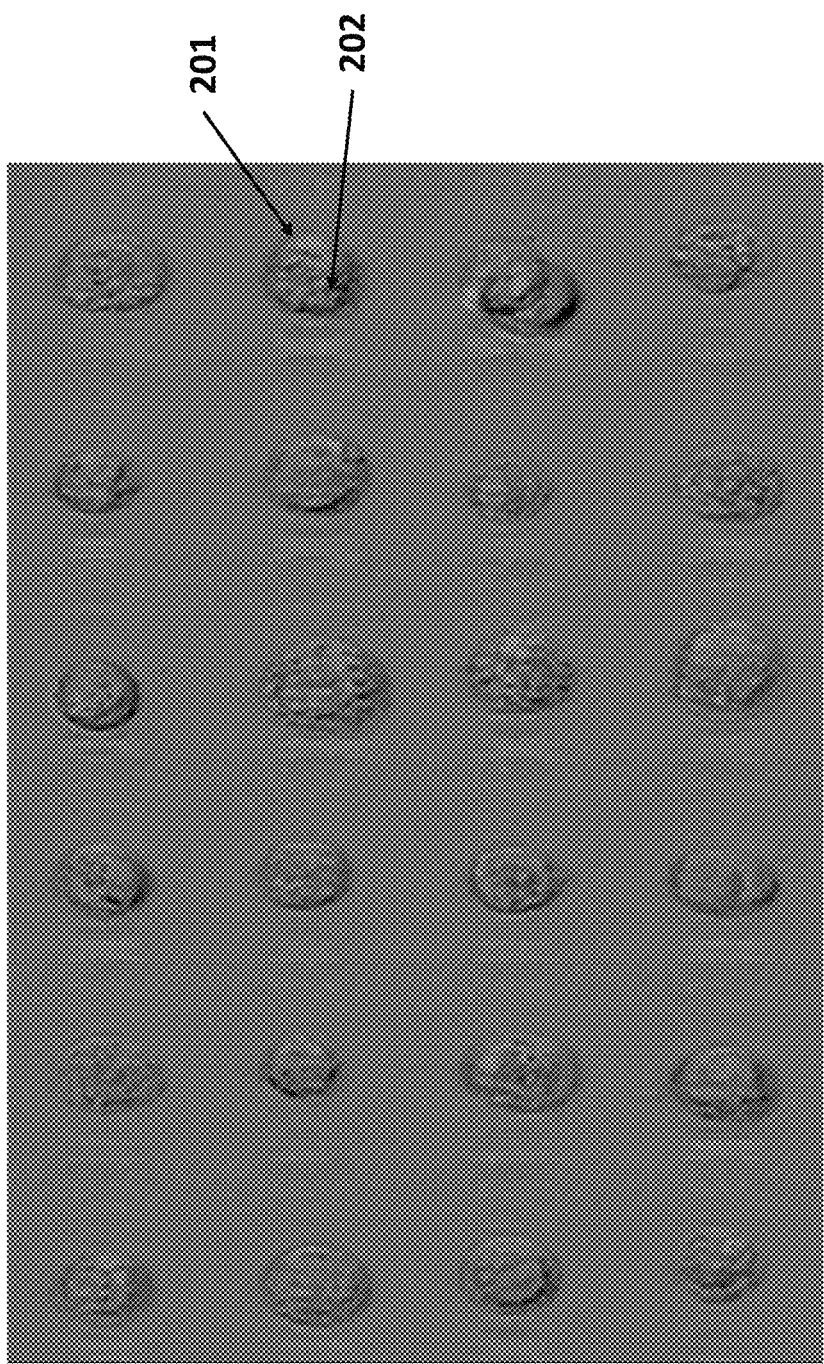
FIG. 2 depicts unstained SkBr3 breast cancer cells imaged from a forward light scatter detector and a brightfield photodetector according to certain embodiments.

FIG. 2 depicts SkBr3 breast cancer cells (unstained) that are imaged from data signals from a forward light scatter detector and a brightfield photodetector simultaneously according to certain embodiments. In these images, the brightfield data signal component (201) provides for a greyscale structure with the shape and size of each cell while the forward scatter data signal component (202) provides for imaging of higher density structures within the cell. By simultaneously imaging cells through both the brightfield channel and the forward scatter channel, advanced morphological features (e.g., position of cellular components such as the nucleus and mitochondria) of the cells can be characterized.

COMPUTER-CONTROLLED SYSTEMS

Aspects of the present disclosure further include computer controlled systems for practicing the subject methods, where the systems further include one or more computers for complete automation or partial automation of a system for practicing methods described herein. In some embodiments, systems include a computer having a computer readable storage medium with a computer program stored thereon, where the computer program when loaded on the computer includes instructions for irradiating a flow stream with a light source, algorithm for detecting light signals from the irradiated flow stream and in certain instances, algorithm for identifying and differentiating between types of cells in the sample based on the detected light signals. In certain instances, systems include a computer having a computer readable storage medium with a computer program stored thereon, where the computer program when loaded on the computer further includes algorithm for generating two or more beams of frequency shifted light with a light beam generator component for irradiating the flow stream. In these instances, the system includes algorithm for applying radiofrequency drive signals (such as with a DDS as described above) to an acousto-optic device (e.g., acousto-optic deflector) and irradiating the acousto-optic device with a laser to generate a plurality of radiofrequency shifted, spatially separated beams of light.

In some instances, the computer program when loaded on the computer further includes instructions having algorithm for generating data signals from the light detected by the scatter detector and the brightfield photodetector. In certain instances, the computer further includes instructions having algorithm for converting the data signals from analog data signals to digital data signals. In certain embodiments, the instructions further include algorithm for generating an image from the digital signals. In other embodiments, the instructions further include algorithm for differentiating between types of cells based on the light scatter data signal and the brightfield data signal. In yet other embodiments, the instructions further include algorithm for generating an image from the light scatter data signal and the brightfield data signal and differentiating between types of cells based on the generated image.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

KITS

Aspects of the invention further include kits, where kits include a light scatter detector, a brightfield photodetector and an optical adjustment component to convey light to a light scatter detector, a brightfield photodetector, such as a beamsplitter (e.g., wedged beamsplitter). Kits may further include other optical adjustment components as described here, such as obscuration components including optical apertures, slits and obscuration discs and scatter bars. Kits according to certain embodiments also include optical components for conveying light to the light scatter detector or brightfield photodetectors, such as collimating lenses, mirrors, wavelength separators, pinholes, etc. Kits may also include an optical collection component, such as fiber optics (e.g., fiber optics relay bundle) or components for a free-space relay system. In some instances, kits further include one or more photodetectors, such as photomultiplier tubes (e.g., metal package photomultiplier tubes). In certain embodiments, kits include one or more components of a light beam generator, such as a direct digital synthesizer, an acousto-optic deflector, a beam combining lens and a Powell lens.

In some embodiments, kits include 2 or more of the components of the light detection systems disclosed herein, such as 3 or more and including 5 or more. In some instances, the kits can include one or more assay components (e.g., labeled reagents, buffers, etc., such as described above). In some instances, the kits may further include a sample collection device, e.g., a lance or needle configured to prick skin to obtain a whole blood sample, a pipette, etc., as desired.

The various assay components of the kits may be present in separate containers, or some or all of them may be pre-combined. For example, in some instances, one or more components of the kit, e.g., the light scatter detector, brightfield photodetector, beamsplitter are present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

UTILITY

The subject light detection systems find use where the characterization of a sample by optical properties, in particular where identification and differentiation of cells in a sample, is desired. In some embodiments, the systems and methods described herein find use in flow cytometry characterization of biological samples. In certain embodiments, the systems and methods find use in spectroscopy of transmitted and scattered light. In certain instances, the present disclosure finds use in enhancing measurement of light collected from a sample that is irradiated in a flow stream in a flow cytometer. Embodiments of the present disclosure find use where enhancing the effectiveness of measurements in flow cytometry are desired, such as in research and high throughput laboratory testing. The present disclosure also finds use where it is desirable to provide a flow cytometer with improved cell sorting accuracy, enhanced particle collection, reduced energy consumption, particle charging efficiency, more accurate particle charging and enhanced particle deflection during cell sorting.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A particle analysis system configured to generate an image of particles in a sample, comprising:
   a flow cell configured to propagate the sample in a flow stream;
   an aspheric lens configured to receive light from the flow cell;
   a mirror configured to reflect light from the aspheric lens;
   a light scatter detector configured to obtain signals corresponding to structures within each particle in the sample;
   a brightfield photodetector configured to obtain signals corresponding to the shape and size of each particle in the sample, wherein the light scatter detector is positioned orthogonally with respect to the brightfield photodetector;
   a beam splitter configured to receive light from the mirror and transmit light to the light scatter detector and reflect light to the brightfield photodetector, wherein the beam splitter is configured to convey 10% or less of the light to the brightfield photodetector and 90% or more of the light to the light scatter detector; and
   a processor configured to generate the image of the particles in the sample based on the signals obtained by the light scatter detector and the brightfield photodetector.

2. The particle analysis system according to claim 1, wherein the light scatter detector is a forward scatter detector.

3. The particle analysis system according to claim 1, wherein the beam splitter is a wedged beam splitter.

4. The particle analysis system according to claim 1, further comprising an obscuration component positioned proximate to the light scatter detector.

5. The particle analysis system according to claim 4, wherein the obscuration component is a scatter bar.

6. The particle analysis system according to claim 4, wherein the obscuration component is an obscuration disc.

7. The particle analysis system according to claim 1, further comprising an obscuration component positioned proximate to the brightfield photodetector.

8. The particle analysis system according to claim 7, wherein the obscuration component is an optical aperture.

9. The particle analysis system according to claim 8, wherein the optical aperture is a slit.

10. The particle analysis system according to claim 8, wherein the optical aperture is a pinhole.

11. A flow cytometer comprising:
    a light source; and
    a flow cell configured to propagate a sample in a flow stream;
    a light detection system configured to generate an image of particles in the sample, comprising:
      an aspheric lens configured to receive light from the flow cell;
      a mirror configured to reflect light from the aspheric lens;
      a light scatter detector configured to obtain signals corresponding to structures within each particle in the sample;
      a brightfield photodetector configured to obtain signals corresponding to the shape and size of each particle in the sample, wherein the light scatter detector is positioned orthogonally with respect to the brightfield photodetector;
      a beam splitter configured to receive light from the mirror and transmit light to the light scatter detector and reflect light to the brightfield photodetector, wherein the beam splitter is configured to convey 10% or less of the light to the brightfield photodetector and 90% or more of the light to the light scatter detector; and
      a processor configured to generate the image of the particles in the sample based on the signals obtained by the light scatter detector and the brightfield photodetector.

12. The flow cytometer according to claim 11, wherein the light source comprises a light beam generator component configured to generate at least a first beam of frequency shifted light and a second beam of frequency shifted light.

13. The flow cytometer according to claim 12, wherein the light beam generator component comprises an acousto-optic deflector.

14. The flow cytometer according to claim 12, wherein the light beam generator component comprises a direct digital synthesizer (DDS) RF comb generator.

15. The flow cytometer according to claim 12, wherein the light beam generator component is configured to generate a frequency-shifted local oscillator beam.

16. The flow cytometer according to claim 12, wherein the light beam generator component is configured to generate a plurality of frequency-shifted comb beams.

17. A method comprising generating an image of particles in a sample with a particle analysis system comprising:
    a flow cell configured to propagate the sample in a flow stream;
    an aspheric lens configured to receive light from the flow cell;
    a mirror configured to reflect light from the aspheric lens;
    a light scatter detector configured to obtain signals corresponding to structures within each particle in the sample;
    a brightfield photodetector configured to obtain signals corresponding to the shape and size of each particle in the sample, wherein the light scatter detector is positioned orthogonally with respect to the brightfield photodetector;

a beam splitter configured to receive light from the mirror and transmit light to the light scatter detector and reflect light to the brightfield photodetector, wherein the beam splitter is configured to convey 10% or less of the light to the brightfield photodetector and 90% or more of the light to the light scatter detector; and a processor configured to generate the image of the particles in the sample based on the signals obtained by the light scatter detector and the brightfield photodetector.

* * * * *